No. 650,796. Patented May 29, 1900.
E. RHINE.
BICYCLE.
(Application filed June 9, 1896. Renewed May 8, 1900.)
(No Model.)
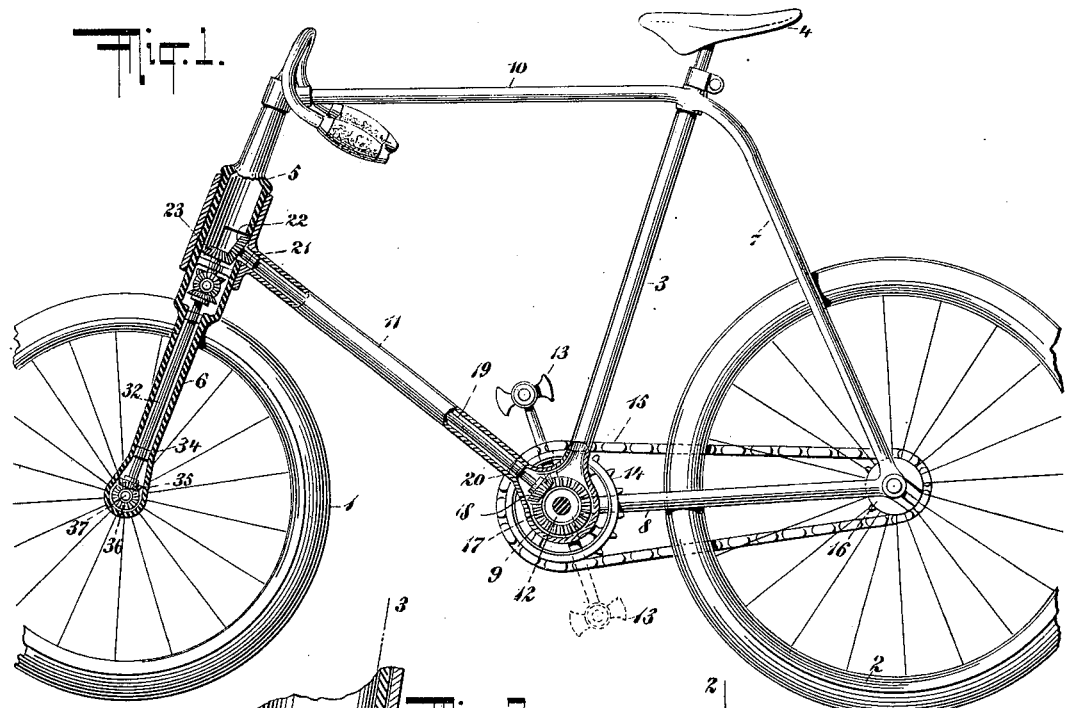
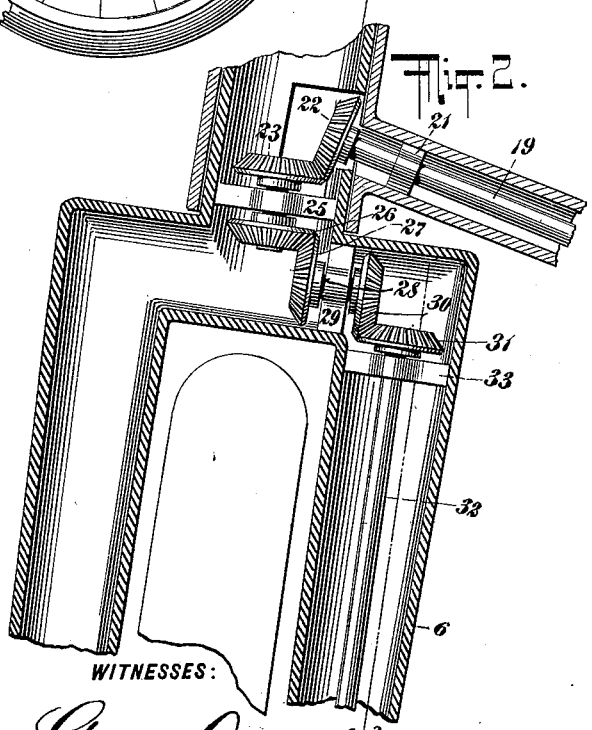
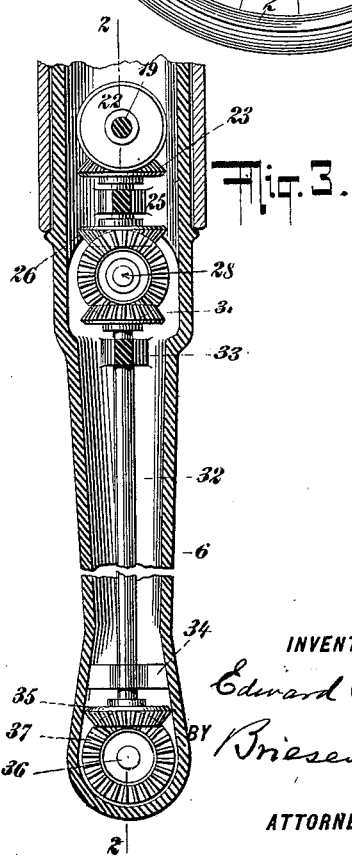
WITNESSES:
INVENTOR
Edward Rhine,
BY Briesen & Knauth
ATTORNEYS.

United States Patent Office.

EDWARD RHINE, OF MOUNT VERNON, NEW YORK.

BICYCLE.

SPECIFICATION forming part of Letters Patent No. 650,796, dated May 29, 1900.

Application filed June 9, 1896. Renewed May 8, 1900. Serial No. 15,947. (No model.)

*To all whom it may concern:*

Be it known that I, EDWARD RHINE, a resident of Mount Vernon, Westchester county, State of New York, have invented certain new and useful Improvements in Bicycles, of which the following is a specification.

My invention relates to bicycle driving-gear, and has for its object to produce an efficient bicycle driving-gear which may be applied to existing forms of bicycles.

My invention consists in the construction hereinafter set forth and claimed.

My invention will be understood by referring to the accompanying drawings.

In the drawings, Figure 1 is a side view of a bicycle, partly broken away and in section, embodying my invention. Fig. 2 is an enlarged sectional detail view of the fork and steering-head of a bicycle, showing the arrangement of the shafts which I employ. Fig. 3 is a section on line 3 3 of Fig. 2, exhibiting also the section-line 2 2, on which the section Fig. 2 is taken.

Referring now particularly to the drawings, I have shown in Fig. 1 a bicycle of the diamond-frame type, consisting of front and rear traction-wheels 1 2, a seat-post 3, a seat 4, a steering-head 5, a front fork 6, a rear-fork frame 7 8, a crank-hanger 9, a connecting-bar 10, connecting the seat-post 3 and the steering-head 5, and an inclined tubular strut 11, running from the crank-hanger to the steering-head. Journaled in the crank-hanger is a suitable crank 12, provided with the usual pedals 13 13, and a sprocket-wheel 14, which is geared, by means of a sprocket-chain 15, with a sprocket 16 on the rear-wheel axle. Mounted also upon the crank-shaft is a spur-gear 17, which meshes with a bevel-pinion 18, carried upon the end of a shaft 19, passing through the tubular strut 11 or hollow portion of the frame and being operatively held therein by thrust-collars 20 21. The opposite end of the shaft 19 is projected through an elongated aperture 40 in the steering-head 5 and is provided with a bevel-pinion 22, which meshes with a bevel-pinion 23, carried upon a short vertical shaft hung in a bracket 25 in the hollow front fork forming part of the hollow steering-head 5. At the opposite end of this shaft is a bevel-pinion 26, which meshes with another bevel-pinion 27 on a horizontal shaft 28, hung in a bracket 29 in the front fork 6. At the opposite end of this shaft 28 is a pinion 30, which meshes with a pinion 31, carried upon the upright shaft 32, hung in thrust-collars 33 34 in the front fork 6. This shaft 32 carries a bevel-pinion 35, which meshes with a bevel-pinion 37 on the shaft 36 of the front traction-wheel 1.

It is thought that the operation of this device will be obvious without explanation, it being understood that the gear 17 is fast upon the crank-shaft 12, so that rotation of the pedals and crank will cause the various shafts intervening between the axle of the front wheel and the crank to rotate, thereby rotating the front wheel through the medium of its axle. It will of course be obvious that the rear wheel of the bicycle will at the same time be rotated by the sprockets and chain, so that both of the wheels of the bicycle will be driven from the crank.

By reason of the fact that the hollow steering-head 5 is apertured or cut away, as indicated at 40, the shaft 19, which projects through said cut-away portion into the hollow head, will not interfere with the axial movement of the head, which is necessary in steering the cycle. Such accelerating or retarding action as may be given to the front wheel while the handle-bar is being turned in steering is so slight that no appreciable effect is noticeable in practice.

I am aware that it is not broadly new to drive the front wheel of a bicycle by means of gearing, as such a construction is shown in United States Letters Patent to R. K. Hartley, No. 484,712, dated October 18, 1892. I am likewise aware that it is not broadly new to drive both wheels of a bicycle from a common crank, such a construction being shown in Letters Patent to Caleb L. Cunningham, No. 559,934, patented May 12, 1896.

What I claim, and desire to secure by Letters Patent, is—

A bicycle comprising a frame which is hollow in parts, front and rear traction-wheels, a pedal-driven crank-shaft, suitable connections between said crank-shaft and rear traction-wheel, a driving-shaft contained within a hollow part of the frame and adapted to rotate the front traction-wheel and intermediate shafts and bevel-gear connections between the pedal-driven crank-shaft and driving-shaft of the front traction-wheel, said intermediate shafts and bevel-gear connections being contained and operating within the hollow parts of the frame and extending through an elongated aperture in the steering-head, which aperture permits the necessary axial movement of the steering-head with relation to the frame of the bicycle when the steering-head is turned to change the direction of movement of the bicycle, substantially as and for the purposes specified.

EDWARD RHINE.

Witnesses:
GEORGE H. ENGELHARD,
GEO. E. MORSE.